US006474085B2

(12) United States Patent
Uno et al.

(10) Patent No.: US 6,474,085 B2
(45) Date of Patent: Nov. 5, 2002

(54) REFRIGERATING APPARATUS

(76) Inventors: Masaki Uno, c/o Shimizu Works, Hitachi Air Conditioning Systems Co., Ltd. 390 Muramatsu, Shimizu-shi, Shizuoka-ken 424-0926 (JP); Katsuhiko Taki, c/o Shimizu Works, Hitachi Air Conditioning Systems Co., Ltd. 390 Muramatsu, Shimizu-shi, Shizuoka-ken 424-0926 (JP); Sadao Ohyama, c/o Shimizu Works, Hitachi Air Conditioning Systems Co., Ltd. 390 Muramatsu, Shimizu-shi, Shizuoka-ken 424-0926 (JP)

( * ) Notice: Subject to any disclaimer, the term of this patent is extended or adjusted under 35 U.S.C. 154(b) by 0 days.

(21) Appl. No.: 09/985,746

(22) Filed: Nov. 6, 2001

(65) Prior Publication Data

US 2002/0116938 A1 Aug. 29, 2002

(30) Foreign Application Priority Data

Feb. 27, 2001 (JP) ......................... 2001-051380

(51) Int. Cl.[7] ............................. F25B 7/00; G05D 23/00
(52) U.S. Cl. ....................... 62/175; 236/1 EA; 62/228.3
(58) Field of Search ................. 62/175, 228.3, 62/228.4, 228.5; 263/1 EA, 1 E; 417/38

(56) References Cited

U.S. PATENT DOCUMENTS 4,184,341 A * 1/1980 Friedman ..................... 62/175
4,384,462 A * 5/1983 Overman et al. ............. 62/175
4,535,602 A * 8/1985 Alsenz et al. ................ 62/175
4,612,776 A * 9/1986 Alsenz ......................... 62/175
4,951,475 A * 8/1990 Alsenz ......................... 62/117
5,050,397 A * 9/1991 Sugiyama et al. ........... 62/175
6,330,804 B1 * 12/2001 Uno et al. .................... 62/175

FOREIGN PATENT DOCUMENTS

| JP | A-8-189709 | 7/1996 |
| JP | A-8-271063 | 10/1996 |
| JP | A-10-141784 | 5/1998 |
| JP | A-2000-257964 | 9/2000 |

* cited by examiner

Primary Examiner—Denise L. Esquivel
Assistant Examiner—Marc Norman
(74) Attorney, Agent, or Firm—Antonelli, Terry, Stout & Kraus, LLP

(57) ABSTRACT

A refrigerating apparatus comprising a refrigerating cycle having compressors, a condenser, a liquid receiver, expansion valves and evaporators; and a suction pressure sensor for detecting a pressure on suction sides of the compressors; wherein when the suction pressure has at least a capacity-up pressure value, it causes an increase in the number of compressors being operated or the operating frequency; and wherein when a time period, in which the suction pressure remains in at least the capacity-up pressure value, and a time period, in which the suction pressure remains in at most the capacity-down pressure value, are compared with each other and calculated, and the latter time period is longer than the former time period, at least one of the capacity-up pressure value and the capacity-down pressure value is made larger than said each pressure value.

8 Claims, 4 Drawing Sheets

REFRIGERATING APPARATUS

BACKGROUND OF THE INVENTION

The present invention relates to a refrigerating apparatus and more particularly to a refrigerating apparatus for stores suited for refrigerating a plurality of showcases connected together with large load variations.

In conventional refrigerating apparatuses described, for example, in JP-A-8-271063, it has been known that a capacity-up pressure value and a capacity-down pressure value are determined for set pressures, and when a suction pressure has at least the capacity-up pressure value, the number of compressors being operated or the operating frequency is increased to raise the operating capacity, and when the suction pressure has at most the capacity-down pressure value, the number of compressors being operated or the operating frequency is reduced, and that the set pressure values are automatically changed according to temperatures detected inside and outside a store.

In the prior technique described above, when a load is large and frequently fluctuates, and a set pressure range is decreased in order to provide for fine operation at an optimum operating pressure, it is inevitable to repeat on/off operation of a compressor or to frequently change the inverter frequency. Therefore, there has been a fear that power consumption involved in on/off operation is made large in loss at the startup and with an inverter compressor, power consumption involved in a change in revolution is made large in loss.

An object of the present invention is to provide a highly reliable refrigerating apparatus, which is made optimum in operating pressure for a load of large fluctuations and is effective in energy saving.

BRIEF SUMMARY OF THE INVENTION

To achieve the above objective, the present invention provides a refrigerating apparatus comprising a refrigerating cycle having compressors, a condenser, a liquid receiver, expansion valves and evaporators; and a suction pressure sensor for detecting a pressure on suction sides of the compressors; wherein when the suction pressure has at least a capacity-up pressure value, it causes an increase in the number of compressors being operated or the operating frequency; and when the suction pressure has at most a capacity-down pressure value, it causes reduction in the number of compressors being operated or the operating frequency; wherein when a time period, in which the suction pressure remains in at least the capacity-up pressure value, and a time period, in which the suction pressure remains in at most the capacity-down pressure value, are compared with each other and calculated, and the latter time period is longer than the former time period, at least one of the capacity-up pressure value and the capacity-down pressure value is made larger than said each pressure value (the capacity-up pressure value or the capacity-down pressure value).

Thereby, a time period of operation at the minimum required operating capacity is extended, which is effective in energy saving to enable reducing an amount of electric power consumed, and the number of on/off times of the compressor or a change in operating frequency is reduced, which can reduce power loss for a refrigerating capacity provided by a refrigerating machine.

In the above-mentioned refrigerating apparatus, when the time period, in which the suction pressure remains in at most the capacity-down pressure value, is shorter than the time period, in which the suction pressure remains in at least the capacity-up pressure value, at least one of the capacity-up pressure value and the capacity-down pressure value is made smaller than said each pressure value.

Further, the present invention provides a refrigerating apparatus comprising a refrigerating cycle having compressors, a condenser, a liquid receiver, expansion valves and evaporators; and a suction pressure sensor for detecting a pressure on suction sides of the compressors; wherein when the suction pressure has at least a capacity-up pressure value, it causes an increase in the number of compressors being operated or the operating frequency; and when the suction pressure has at most a capacity-down pressure value, it causes reduction in the number of compressors being operated or the operating frequency; and wherein when a rate of a change in the suction pressure is larger than a predetermined value, at least one of the capacity-up pressure value and the capacity-down pressure value is made larger than said each pressure value.

Further, in the above-mentioned refrigerating apparatus, when the rate of a change in the suction pressure is smaller than the predetermined value, at least one of the capacity-up pressure value and the capacity-down pressure value is made smaller than said each pressure value.

Further, according to the present invention, the compressors are plural in number, and when a time period having lapsed from a point of time, at which the suction pressure has at least the capacity-up pressure value, to a point of time, at which one of the plurality of the compressors stops, is determined, and is shorter than a predetermined time period, at least one of the capacity-up pressure value and the capacity-down pressure value is made larger than said each pressure value.

Further, in the above-mentioned refrigerating apparatus, when the time period having elapsed until the stoppage of one of the plurality of the compressors is longer than the predetermined duration, at least one of the capacity-up pressure value and the capacity-down pressure value is desirably made smaller than said each pressure value.

Further, according to the present invention, a time period having lapsed from a point of time, at which the suction pressure has at least the capacity-up pressure value, to a point of time, at which the suction pressure has at most the capacity-up pressure value, is determined, and is shorter than a predetermined duration, at least one of the capacity-up pressure value and the capacity-down pressure value is made larger than said each pressure value.

Further, in the above-mentioned refrigerating apparatus, when a rate of a change in the suction pressure is larger than a predetermined value, at least one of the capacity-up pressure value and the capacity-down pressure value is made larger than said each pressure value.

DETAILED DESCRIPTION OF THE INVENTION

Embodiments of the present invention will be described with reference to FIGS. 1 to 7.

Figure 1:
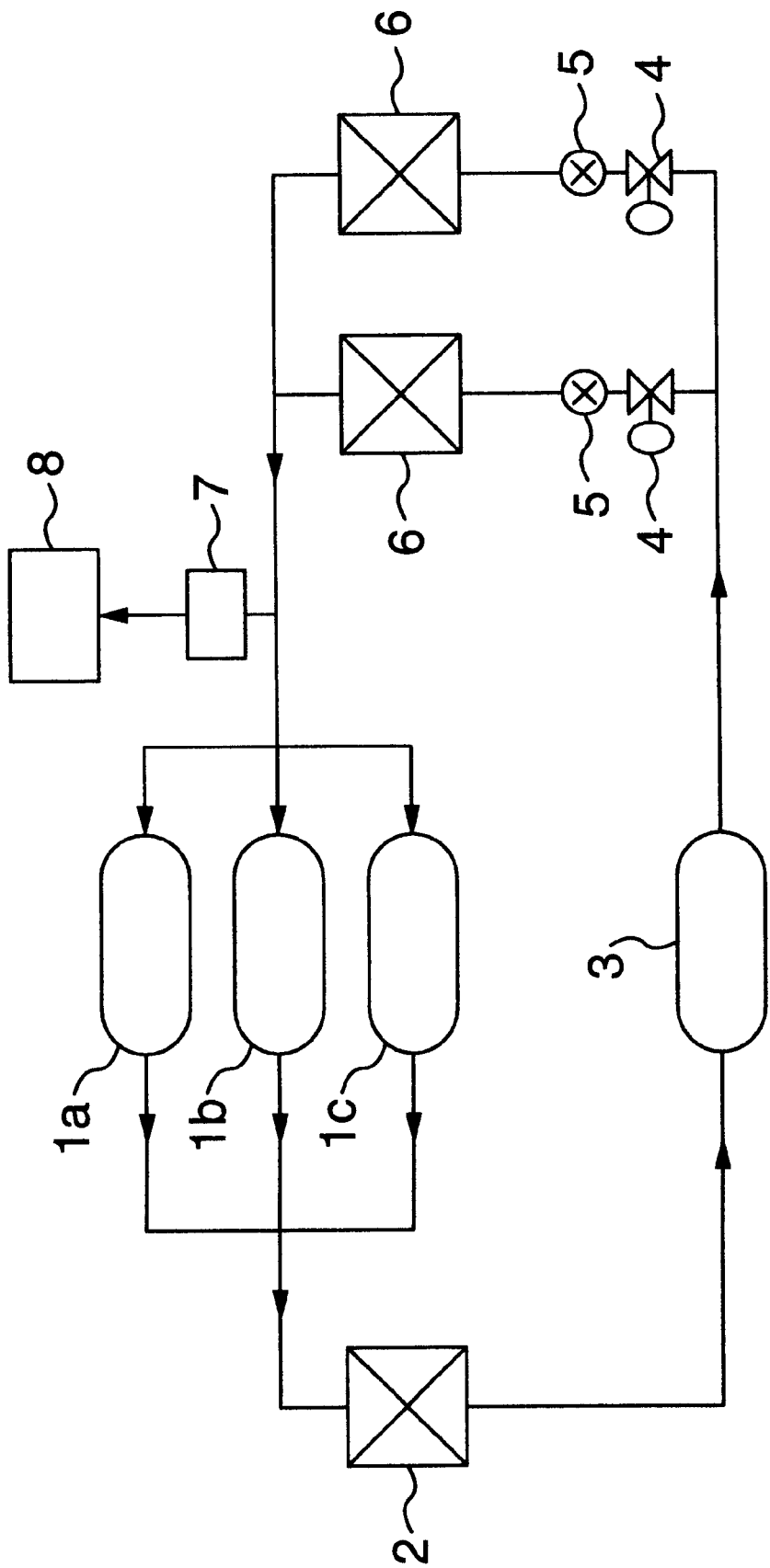
FIG. 1 is a schematic diagram showing a refrigerating cycle of a refrigerating apparatus in accordance with an embodiment of the present invention.

FIG. 1 illustrates an example of a fundamental refrigerating cycle of a refrigerating apparatus according to the present invention. In FIG. 1, the refrigerating cycle is composed of main equipments such as compressors 1a, 1b, 1c, a condenser 2, a liquid receiver 3, solenoid valves 4, expansion valves 5, and evaporators 6. In a piping on the suction side of the condenser 2 is installed a pressure sensor 7 to detect a suction pressure, a value of which is processed by a unit controller 8, whereby the operating capacity of the compressors at that time is determined. That is, when the suction pressure of the compressors has at least a capacity-up pressure value, it causes an increase in the number of compressors being operated or the operating frequency; and when the suction pressure has at most a capacity-down pressure value, it causes reduction in the number of compressors being operated or the operating frequency.

In order to attain further energy saving also for load of large fluctuation, the capacity-up pressure value and the capacity-down pressure value themselves are changed, which is described below.

Figure 2:
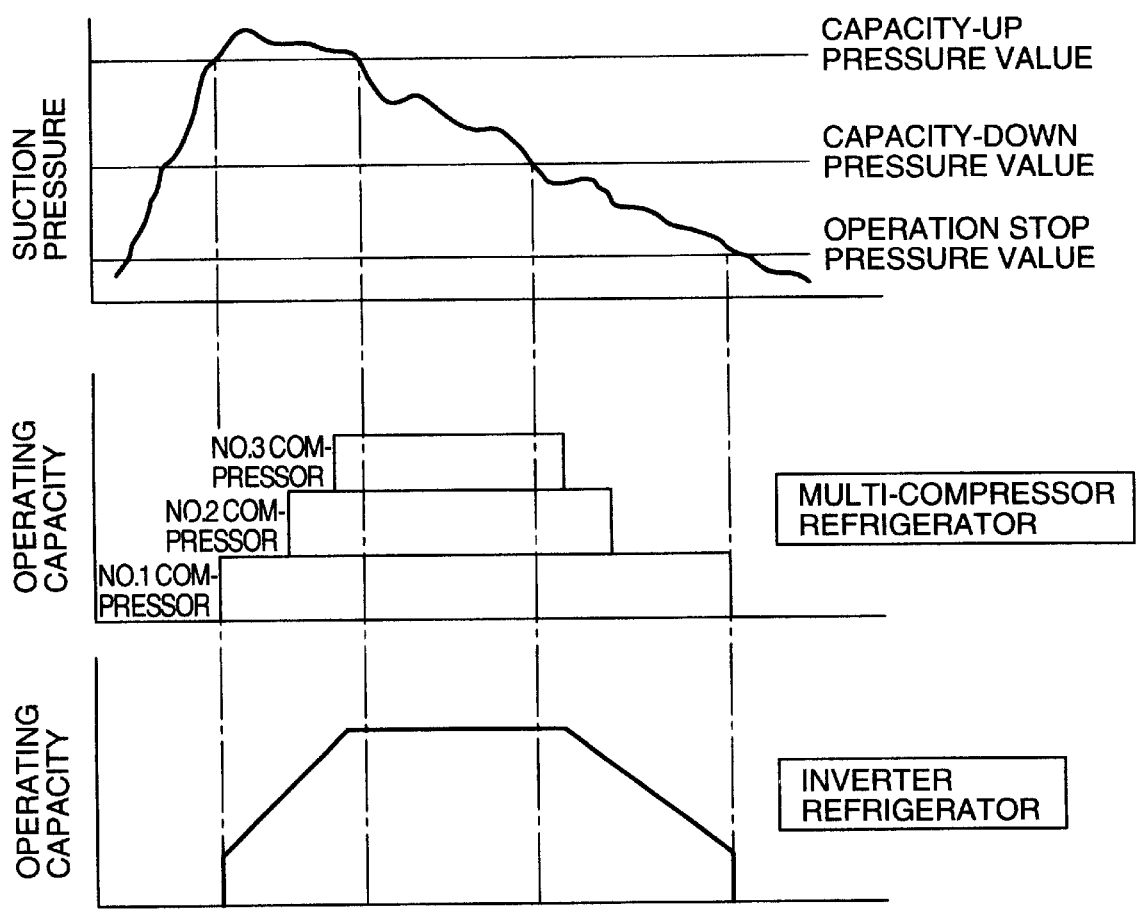
FIG. 2 is a graph showing the relationship between suction pressure and capacity control in accordance with the embodiment of the present invention.

FIG. 2 illustrates an example of an operating capacity control for the refrigerating apparatus according to one embodiment of the invention. In an upper graph in FIG. 2, an example of changes in suction pressure with time is shown, the abscissa representing time and the ordinate representing a suction pressure. Likewise, FIG. 3 also illustrates a change in suction pressure with time, as well as the relationship among a capacity-up pressure value, a capacity-down pressure value and an operation stop pressure value, at which the compressors are stopped.

When the suction pressure has at least the capacity-up pressure value, with a multi-compressor refrigerator with a plurality of compressors as shown in a middle diagram of FIG. 2, the operating capacity is increased from only No. 1 compressor to No. 1 compressor plus No. 2 compressor and further to Nos. 1, 2 and 3 compressors, and with an inverter refrigerator (compressor), the operating frequency is increased as shown in a lower diagram of FIG. 2.

Conversely, when the suction pressure has at most the capacity-down pressure value, with the multi-compressor refrigerator the number of compressors being operated is reduced, and with the inverter refrigerator the operating frequency is reduced to decrease the operating capacity.

Next, an explanation will be given, with reference to FIG. 7, to an effect of reduction in the number of on/off times of the compressors and an effect in the inverter refrigerator when the capacity-up pressure value and the capacity-down pressure value are shifted upward.

Figure 3:
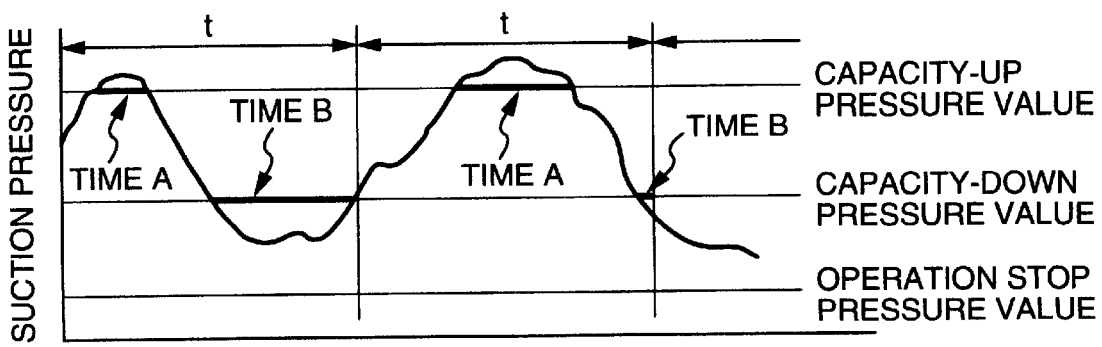
FIG. 3 is a graph showing shifting of pressure values in accordance with the embodiment of the present invention.

In the case where every preset time period t of detection the relation ship a time period B>a time period A is established where the time period A is obtained by adding up time periods, in which the suction pressure has at least the capacity-up pressure value, and the time period B is obtained by adding up time periods, in which the suction pressure has at most the capacity-down pressure value, as shown in FIG. 3, it is judged that a time period, in which the suction pressure has at most the capacity-down pressure value, is long and a load is small, and then the capacity-up pressure value and the capacity-down pressure value are shifted upward. This reduces the number of on/off times of the compressors, as shown in FIG. 7, and extends a time period, in which the compressor is operated at the minimum required capacity even when a load is small, thus achieving a substantial energy saving effect. Also, as shown in the upper diagram of FIG. 7, with the inverter refrigerator, an energy saving effect can be achieved because the pressure values are shifted upward to reduce a change in the operating frequency and besides the inverter refrigerator can be operated at a low frequency for the same load. In other words, an amount of electric power with the compressor turned on varies in a manner indicated by solid lines in FIG. 6, and the actual refrigerating capacity is as shown by solid regions in FIG. 6. Therefore, the difference between the both makes power losses, and so the sum of power losses is small in a predetermined period of time when the number of on/off times is small. The same is the case with the inverter refrigerator in terms of points of time when the operating frequency changes. In order to enhance the reliability for an optimum operating pressure, it is preferable in the actual control programs that a time period B>a time period A×C holds where C is a variable constant equal to or higher than unity.

Further, when a time period A>a time period B is established, it is judged that time periods, in which the suction pressure has at least the capacity-up pressure value, are long and so a load is large, and thus the capacity-up pressure value and the capacity-down pressure value are shifted downward. Thereby, an early increase in capacity is made possible by decreasing the capacity-up pressure value even when a load increases, whereby it is possible to avoid shortage in load cooling even at the startup or in the event of large fluctuations in load.

Figure 4:
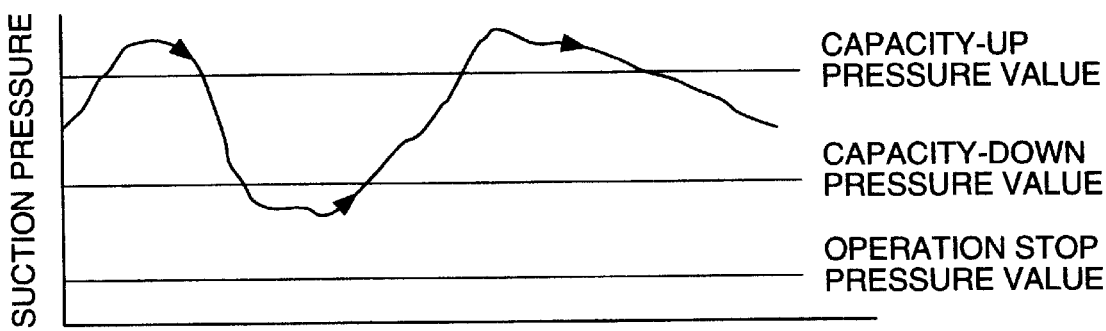
FIG. 4 is a graph showing shifting of pressure values in accordance with another embodiment of the present invention.

Next, an explanation will be given, with reference to FIG. 4, to an example, in which the pressure values are shifted according to the changing rate in suction pressure. When the suction pressure has at least the capacity-up pressure value and a gradient of change in the suction pressure is steep, that is, a rate of change in suction pressure is larger than a predetermined value since the start of operation of the compressor, it is judged that a load is small, and thus the pressure values are shifted upward. Thereby, a time period of operation at the minimum required capacity is extended and the number of on/off times of the compressor is reduced, whereby a substantial energy saving can be realized.

When the gradient of change in suction pressure after the startup of the compressor is gentle, a load is large and so the pressure values are shifted downward. Since the capacity-up pressure value is decreased thereby even when a load increases, an early increase in the operating capacity is made possible, thus enabling avoiding shortage in cooling. Hereupon, it is determined by the unit controller whether the gradient of change in suction pressure is steep or gentle.

Figure 5:
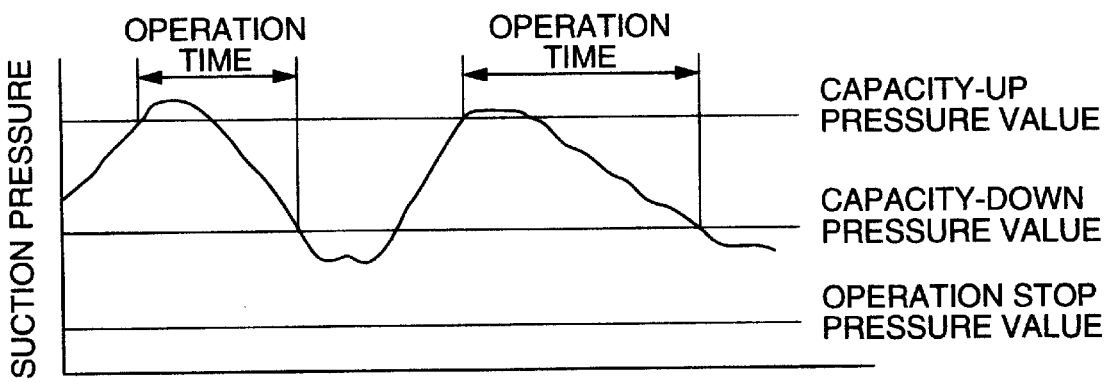
FIG. 5 is a graph showing shifting of pressure values in accordance with still another embodiment of the present invention.
Figure 6:
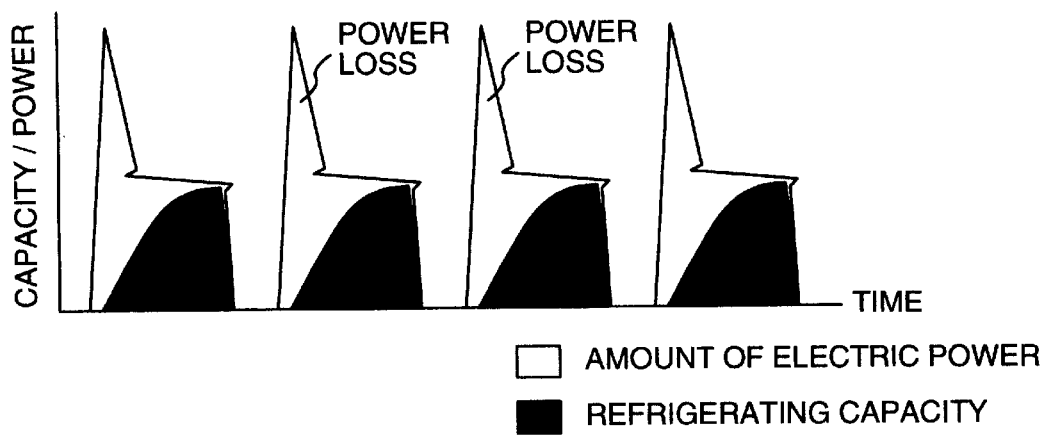
FIG. 6 is a graph showing electric power loss produced when a compressor is actuated.

Next, an explanation will be given, with reference to FIG. 5, to an example, in which the pressure values are shifted according to the operation time having elapsed from the startup to the stoppage of the compressor. In the case where the suction pressure has at least the capacity-up pressure value and a time period from the startup to stoppage of the compressor is shorter than a predetermined value, it is judged that a load is small, and the pressure values are shifted upward such that at least one of the capacity-up pressure value and the capacity-down pressure value is made a large value.

Figure 7:
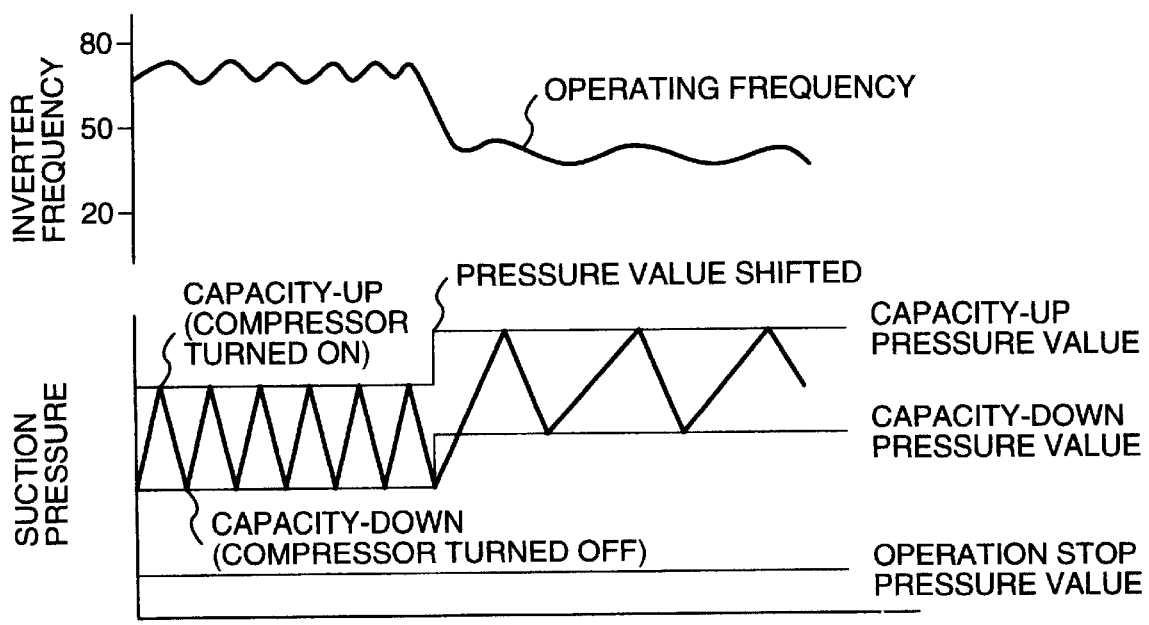
FIG. 7 is a graph illustrating the number of on/off times of the compressor and a change in operating frequency in accordance with an embodiment of the present invention.

Thereby, a time period of operation at the minimum required operating capacity is extended and the number of on/off times of the compressor or a change in operating frequency can be also reduced as shown in FIG. 7, thus enabling reducing a power consumption.

In the case where a time period from the startup to stoppage of the compressor is short, it is judged that a load is large, and thus the pressure values are shifted downward. Since the capacity-up pressure value is decreased thereby even when a load increases, an early increase in the operating capacity is made possible, thus enabling avoiding shortage in cooling.

In shifting of the pressure values described above, when either of the capacity-up pressure value and the capacity-down pressure value is shifted to broaden a range between the pressure values, the number of on/off times of the compressor can further be reduced.

In the capacity control described above, it is also possible to suitably combine two different ways, that is, one comprising finding a time period from a point of time when the suction pressure has at least the capacity-up pressure value, to a point of time when the suction pressure has at most the capacity-down pressure value, and making at least one of the capacity-up pressure value and the capacity-down pressure value a large one when the time period is smaller than a predetermined value, and the other comprising making the capacity-up pressure value or the capacity-down pressure value a large one when the rate of change in suction pressure is larger than a predetermined value.

According to this invention, the suction pressure of the refrigerating apparatus is detected, and the capacity-up pressure value and the capacity-down pressure value, which are pressure set values, are shifted, thus making it possible to optimize the operation pressure even for a load of large fluctuation, and to provide for further energy saving and high reliability.

What is claimed is:

1. A refrigerating apparatus comprising:
    a refrigerating cycle having compressors, a condenser, a liquid receiver, expansion valves and evaporators; and
    a suction pressure sensor for detecting a pressure on suction sides of the compressors;
    wherein when the suction pressure has at least a capacity-up pressure value, it causes an increase in the number of compressors being operated or the operating frequency; and when the suction pressure has at most a capacity-down pressure value, it causes reduction in the number of compressors being operated or the operating frequency;
    wherein when a time period, in which the suction pressure remains in at least the capacity-up pressure value, and a time period, in which the suction pressure remains in at most the capacity-down pressure value, are compared with each other and calculated, and the latter time period is longer than the former time period, at least one of the capacity-up pressure value and the capacity-down pressure value is made larger than said each pressure value.

2. The refrigerating apparatus according to claim 1, wherein when the time period, in which the suction pressure remains in at most the capacity-down pressure value, is shorter than the time period, in which the suction pressure remains in at least the capacity-up pressure value, at least one of the capacity-up pressure value and the capacity-down pressure value is made smaller than said each pressure value.

3. A refrigerating apparatus comprising:
    a refrigerating cycle having compressors, a condenser, a liquid receiver, expansion valves and evaporators; and
    a suction pressure sensor for detecting a pressure on suction sides of the compressors;
    wherein when the suction pressure has at least a capacity-up pressure value, it causes an increase in the number of compressors being operated or the operating frequency; and when the suction pressure has at most a capacity-down pressure value, it causes reduction in the number of compressors being operated or the operating frequency; and
    wherein when a rate of a change in the suction pressure is larger than a predetermined value, at least one of the capacity-up pressure value and the capacity-down pressure value is made larger than said each pressure value.

4. The refrigerating apparatus according to claim 3, wherein when the rate of a change in the suction pressure is smaller than the predetermined value, at least one of the capacity-up pressure value and the capacity-down pressure value is made smaller than said each pressure value.

5. A refrigerating apparatus comprising:
    a refrigerating cycle having compressors, a condenser, a liquid receiver, expansion valves and evaporators; and
    a suction pressure sensor for detecting a pressure on suction sides of the compressors;
    wherein when the suction pressure has at least a capacity-up pressure value, it causes an increase in the number of compressors being operated or the operating frequency; and when the suction pressure has at most a capacity-down pressure value, it causes reduction in the number of compressors being operated or the operating frequency;
    wherein the compressors are plural in number, and when a time period having elapsed from a point of time, at which the suction pressure has at least the capacity-up pressure value, to a point of time, at which one of the plurality of the compressors stops, is determined, and is shorter than a predetermined duration, at least one of the capacity-up pressure value and the capacity-down pressure value is made larger than said each pressure value.

6. The refrigerating apparatus according to claim 5, wherein when the time period having elapsed until the stoppage is longer than the predetermined duration, at least one of the capacity-up pressure value and the capacity-down pressure value is made smaller than said each pressure value.

7. A refrigerating apparatus comprising:
    a refrigerating cycle having compressors, a condenser, a liquid receiver, expansion valves and evaporators; and
    a suction pressure sensor for detecting a pressure on suction sides of the compressors;
    wherein when the suction pressure has at least a capacity-up pressure value, it causes an increase in the number of compressors being operated or the operating frequency; and when the suction pressure has at most a capacity-down pressure value, it causes reduction in the number of compressors being operated or the operating frequency;
    when a time period having elapsed from a point of time, at which the suction pressure has at least the capacity-up pressure value, to a point of time, at which the suction pressure has at most the capacity-up pressure value, is determined, and is shorter than a predetermined duration, at least one of the capacity-up pressure value and the capacity-down pressure value is made larger than said each pressure value.

8. The refrigerating apparatus according to claim 7, wherein when a rate of a change in the suction pressure is larger than a predetermined value, at least one of the capacity-up pressure value and the capacity-down pressure value is made larger than said each pressure value.

* * * * *